United States Patent [19]

Kückens

[11] Patent Number: 4,835,903
[45] Date of Patent: Jun. 6, 1989

[54] CARBONIC ACID APPLICATION TO PLANTS

[75] Inventor: Alexander Kückens, Gross Sarau, Fed. Rep. of Germany

[73] Assignee: Technica Entwicklungsgesellschaft mbH & Co. KG, Ratzeburg, Fed. Rep. of Germany

[21] Appl. No.: 152,642

[22] Filed: Feb. 5, 1988

[30] Foreign Application Priority Data

May 27, 1987 [AT] Austria .............................. 1366/87

[51] Int. Cl.$^4$ .............................. A01G 7/00

[52] U.S. Cl. .............................. 47/58; 71/79; 239/124

[58] Field of Search .............................. 47/1, 58, 485, 28; 71/1, 76, 79, 11; 239/307, 308, 372, 373, 305, 124, 127

[56] References Cited

U.S. PATENT DOCUMENTS

| | | | |
|---|---|---|---|
| 3,532,485 | 10/1970 | Stevens | 71/1 |
| 3,578,431 | 5/1971 | Ingestad et al. | 71/1 |
| 3,647,411 | 3/1972 | Stevens | 71/1 |
| 4,030,244 | 6/1977 | Tennes et al. | 239/124 |
| 4,121,767 | 10/1978 | Jensen | 239/124 |
| 4,515,617 | 5/1985 | Holmwood et al. | 71/76 |
| 4,530,715 | 7/1985 | Kranz et al. | 71/76 |
| 4,675,165 | 6/1987 | Kückens et al. | 47/48.5 |
| 4,689,067 | 8/1987 | Kückens et al. | 71/79 |
| 4,697,739 | 10/1987 | McCracken et al. | 239/127 |

FOREIGN PATENT DOCUMENTS

| | | |
|---|---|---|
| 3215958 | 11/1983 | Fed. Rep. of Germany . |
| 202231 | 9/1983 | German Democratic Rep. . |

*Primary Examiner*—James R. Feyrer
*Attorney, Agent, or Firm*—Herbert Dubno

[57] ABSTRACT

By specific setting of the $CO_2$ content and pH value of the spraying mixtures containing, apart from water, minerals and/or products for pest and disease control of the plant, the metabolism of plants is specifically stimulated and encouraged so that storage in the plants of surplus nutrients is avoided and their health and resistance is improved. The spraying mixture is constantly and over an extended period kept circulating. Both pH value and $CO_2$ content of the spraying mixure is constantly measured. While doing this, the Ph value of the spraying mixture is exactly set. In this way the existing agricultural spraying devices having a spraying mixture circulating system are economically operated.

3 Claims, 1 Drawing Sheet

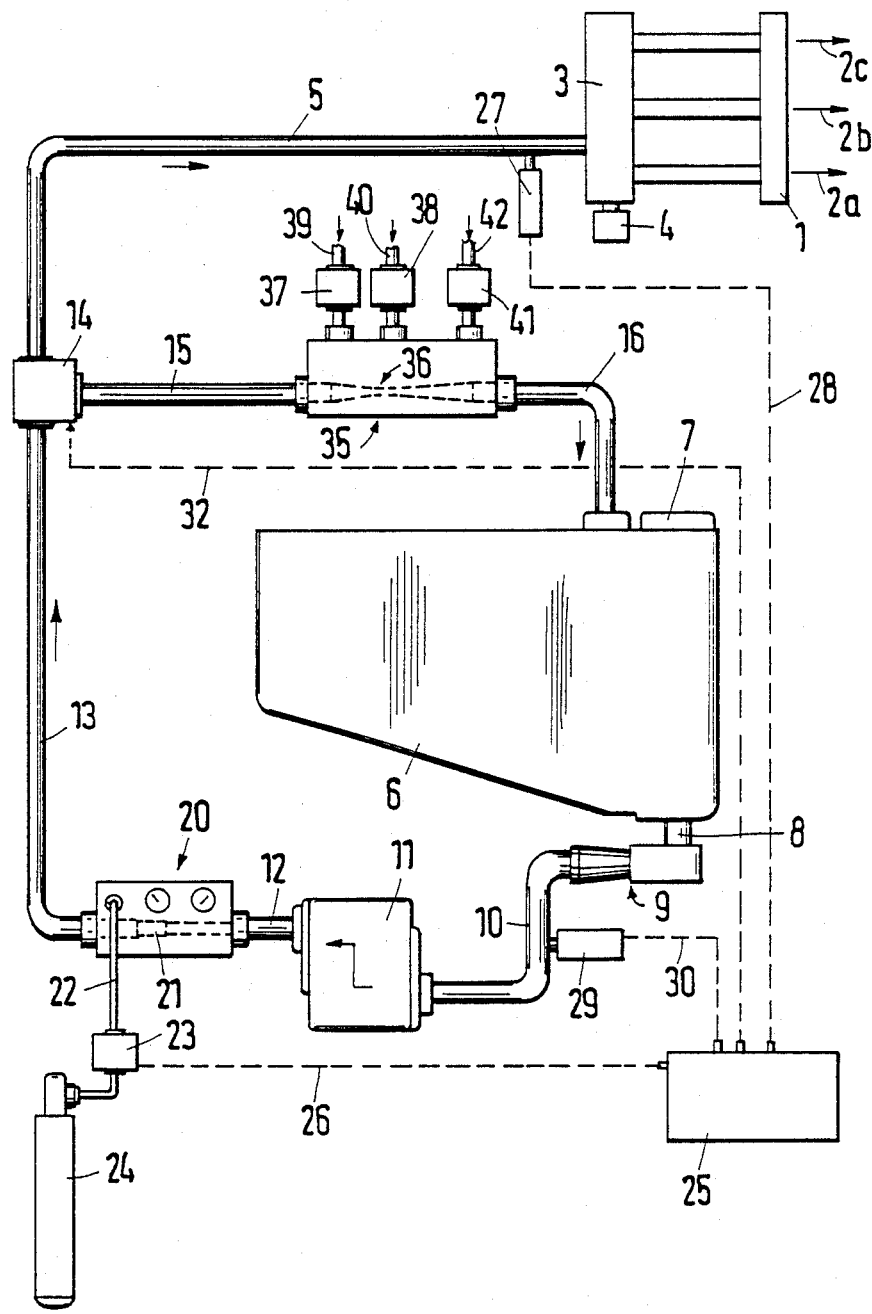

CARBONIC ACID APPLICATION TO PLANTS

FIELD OF THE INVENTION

The invention concerns a procedure and an arrangement to improve the metabolism and to avoid particularly the softening of the tissue caused by a nitrogen surplus with culture plaints in glasshouses and outdoors.

BACKGROUND OF THE INVENTION

It is a known fact that for many years the increasing use of fertilizer has not only caused an increase in yield, but also a substantially higher susceptibility of cultured plants to attack by pests, virus and fungus. Consequently the increased use of fertilizer has also been accompanied by an increased application of pesticides. High application of fertilizer and increased use of products for pest and disease control has led to a general impoverishing of the natural edaphon of the soil and to an endagering of man and animal by impairing the quality of ground water.

It is a known fact that nitrogen is in various compounds the main fertilizer in landscaping. A lack of nitrogen supply has a negative effect on the entire metabolism of the plant, as nitrogen is a fundamental constituent for all the physiologically important structures. So plants suffering from lack of nitrogen are small, puny and limited in their yield. If, however, nitrogen or any other nutrient is applied in surplus i.e. in amounts that can't be entirely exploited by the plant, the plants appear to be strong and health. They appear darkgreen and have large and lushy leaves. Closer investigation shows, however, that the tissue of such plants is soft and spongy as a consequence of underdevelopment of the elements influencing the strength of the plants.

This soft tissue structure results in various negative effects, For instance, such plants prove to particularly susceptible to pest and diseases. In general the stability of the plants is also very often weakened and the attacks by diseases and pests on the plant increase. This situation can only be combatted by an increased use of chemical products for treatment and control.

It has to be taken into consideration that the metabolism of the plant does not only depend on the amount of fertilizer applied, but on further factors as moisture, heat of evaporation and others. Therefore, if the plant cannot directly process the offered amount of nitrogen by means of the metabolism, the plant will store up the surplus nitrogen. Upon longer storage and a too heavy fertilizer supply, there occurs above mentioned structure weakening of the plants and the susceptibility to for pests.

It is the object of the invention to create a procedure with which the problems indicated may be solved in a simple and reliable way or may be entirely prevented.

SUMMARY OF THE INVENTION

The aforementioned abject is attained according to the invention by increasing the supply of $CO_2/H_2CO_3$ in the aqueous phase of the metabolism processes within the plant and by decomposing the nitrogen compounds being stored within the plant and thus being left unexploited for the metabolism.

In the meantime, detailed crop research has shown that enzymatically by specific supply of $CO_2/H_2CO_3$ in aqueous phase, the capacity of the plant to decompose fast and reliably concentrated amounts of stored nitrogen nutrients is decisively stimulated and the processes of metabolism within the plant are encouraged. Thereby it will be possible, independently from exterir atmospheric indluences, to counteract in a simple and reliable way a surplus of nitrogen or of other nutrients and the damaging influences resulting therefrom. In this way it is also achieved that food for man and animal produced from crops is to an essentially reduced degree stressed by fertilizer such as nitrate. At the same time it is achieved that by strengthening of the cell, the plants develop a natural and high protection against sucking insects, virus or fungal attacks and that they are substantially less often exposed to diseases so that the application of pesticides can be considerably reduced or in parts entirely avoided.

According to the invention a carbonic aqueous phase can be spreyed onto the surface of plants through known applicator devices for leaf fertilization without any problem. It can also be applied for intake underground by the roots, e.g. by drip irrigation.

It has been found sufficient to precision impregnate the aqueous phase with $CO_2$ between 0.05 to 2.5 g per liter water in order to achieve the desired improvement of the metabolism process and decomposition of the nitrogen deposits stored within the culture plant.

It has been found advantageous when accompanying the strengthening of the tissue structure done by means of stimulating the metabolism process with measures leading to a lowering of the pH-value of the aqueous phase.

In that way the damaging effect of sucking pests, virus or fungal attacks on the culture plants treated can also be influenced. The important thing is that the lowering of the pH-value is not effected by any kind of acid, but basically by $H_2CO_3$ as the $CO_2$ gas existing in the aqueous phase as well as the carbonic acid ($H_2CO_3$) existing in the aqueous phase is entirely and completely exploited for stimulating the metabolism processes, and for the decomposition of stored nitrogen, and particularly in case of deficiency symptoms for improved and accelerated nutrients intake and exploitation by the plant. A further advantage is that with one and the same measure there is achieved the stimulation of the metabolism, the decomposition of surplus nitrogen within the plant, and the removal of the damaging influence of insects, virus and fungi.

Furthermore, it is well known from U.S. Pat. Nos. 4,675,165 and 4,689,067 that it is possible to enrich water with carbon dioxide in a simple long lasting way and that water enriched with carbon dioxide promotes the dissolution of organic and inorganic compounds in water i.e. fertilizer and products for pest and disease control. Thereby the availability of these products for the plants via roots as well as via leaf is decisively improved. At the same time the sedimentation of these products within devices for the application of fertilizer or of spraying mixture in the ground or on the leaves is avoided and plugging of the spraying-nozzles or capillary tubes of such application systems is prevented.

A problem with the known art is that for attaining a plant specific promotion of the metabolism including the special circumstances of each particular plant, there is necessary a very exact setting of the $CO_2$-content and the pH-value of the spraying mixture. The previous, often applied impregnation of water with $CO_2$ does lead to a lowering of the pH-value, but an exact setting of the pH-value, however, is not possible.

So, an additional proportioning of fertilizer or products for pest and disease control may lower the $CO_2$-content in an unchecked way caused by non-absorption combined with a dilution effect. Furthermore, the process of ionization lasting a longer time leads to changes of the $CO_2$-content and of the pH-value. The necessity of an exact pH-value setting arises as well from the fact that, for example, certain pests are only able to develop well in a very limited pH-range.

It is advisable to generally avoid lowering the pH-value through acids other than carbonic acid. Carbonic acid is an acid which not only contributes to the ionization of the minerals and trace elements being essential for the plants, but at the same time, its elements and molecules are needed by the plants for the metabolism. A better understanding of these processes is provided in the background that follows.

The very simple formula $CO_2 + H_2O = H_2CO_3$ is only partially accurate.

The American scientist Gilbert Newton Lewis proved that only a very small part of the carbon dioxide being physically dissolved in water forms carbonic acid ($H_2CO_3$). It has been proved in practice that depending on the, carbon dioxide being physically dissolved, only about 0.1% forms carbonic acid which remains stabile, i.e. $CO_2 : H_2CO_3$ corresponds to a proportion of about 1000:1. This proportion can neither be directly influenced by pressure nor by temperature.

If the physical $CO_2$-concentration allows further formation of chemically dissolved carbonic acid, the $H_2CO_3$ components in excess of the 1000:1 proportion dissociate into $H^+HCO_3^-$ and $H^+CO_3^-$ ion groups.

These components as well are very essential for the availability of nutrients for the plant and, within the plant itself, for the metabolism. This is the explanation for the influence on the metabolism.

The invention intends therefore to further increase the metabolism processes and the decomposition procedures of the mineral compounds stored, in particular the nitrate-components, within the plant by means of supplying the plants in sufficient amount with vital dissociation forms of $H_2CO_3$ by forming in an aqueous phase through $CO_2$ impregnation a sufficient component of $H_2CO_3$ and then spraying the aqueous phase on the leaf surface of the plant or applying it for underground absorption by the roots.

It is the object of the invention to guarantee in a simple way or to essentially improve the exactness of the $CO_2$ content and the pH-value setting, respectively, as they are essential to stimulation of the metabolism.

Overview of the Invention

During the last years the impregnation device known and sold under the trademark Carborain has proved to be advantageous for precision impregnation. It is an impregnation-system having a straight channel being entirely filled with water flowing through it. This channel has in opposite directions in the flow direction several very small, steplike, cross-sectional enlargments. At these enlargments and at the channel shoulders or the exterior, laminar water flow is momentarily and locally narrow-limited accelerated so that at these narrow-limited places the static pressure is momentarily dropping i.e. under the pressure value under which the $CO_2$ gas is in a distributor section surrounding the channel and being connected to a $CO_2$ source.

The $CO_2$ gas pressure within this distributor section is generally lower than the medium static pressure within the water flow. The sections of the flow channel being directly under the shoulders are placed above a circle of small borings immediately in flow-connection with the distributor section. In these devices the impregnation is not effected by overpressure of the gas in comparision with the water, but the gas is mixed by the exterior laminar water flow layers at the area of the shoulders and in the flow.

This known device can be used for lowering the pH-value due to the fact that the aqueous precision impregnated phase issuing from the outlet of the channel is constantly led back to the inlet of the channel and this is continued until the pH-value requested is lowered to a value of e.g. 5, is reached.

Within the range of this pH-value the attacks of many sucking insects as well as of virus and fungi or others against culture plants can be hampered to a large extent. By means of the fast decomposition of nitrogen, an already weakened plant is enabled to recover quickly and to form healthy and resistant tissue.

In some cases it may be desirable to kill these pests to a great extent. For this purpose the pH value can be lowered to values below 4.5, in particular to a value within the range of 4.0 and 4.4 by adding an organic acid, particularly by adding citric acid. Experiments indicated that in that way a reliable killing, or at least a strong hampering of many pests is achieved.

Often it is already sufficient for strenghening the tissue structure of the culture plants as well as for additional effective controlling of pests to treat the culture plants during the clutivation once or at most a few times with the aqueous phase. It is also possible, without any problem, to repeat the treatment several times during the cultivation if this proves to be necessary. This depends as well on exterior conditions of growth and on the kind of plant.

In any case, the need of $CO_2$ for the treatment is very low, in particular if, for strenghening the tissue structure, the $CO_2$ content per liter water is only between 0.05 and 2.5 g, because on the one hand already the smallest applications of $CO_2$ and $H_2CO_3$ have proved to be effective, and on the other hand with these small parts the losses of $CO_2$ are minute.

Furthermore, the costs are definitely and positively influenced by the fact that the food prodced from the culture plants does not have to be expunged of excessive strains of nitrogen. Furthermore, substantial savings can be attained by reducing or even omitting the treatment of the culture plants with pesticides. In many cases there is eventually even an increase in yield due to the fact that in aqueous phase $CO_2$ and $H_2CO_3$ encourage the absorption of nutrients by the culture plant. Apart from an increased yield and a strenghtening of the natural resistence of the plant with regard to distrubing influences there is also the possibility of getting more natural cultivation conditions for all the culture plants.

Nitrogen is in fact the most important fertilizer, but it is also the one which has the strongest negative effects on the plants, if its compounds (e.g. nitrate or the like) are in surplus. To a quite smaller degree this can also be applied to other fertilizers. In case of a surplus of other fertilizer than nitrogen-compounds, the new procedure can also successfully be applied. The main area of application is, however, the removal of softening of tissue of culture plants caused by nitrogen-surplus. This is also possible with regard to the increasing use of liquid fertilizer. When impregnating $CO_2$ gas in water, the quality of the water may be of great importance for the plants. If, for instance, surface water being mixed with rain water is used, there may be parts of acidic $SO_2$-compounds. Plants react extremely sensitively to such emmissions mainly set off by burning of fossil fuels generating sulphurous acid which disturbs photosynthesis. For this reason the water destined for the $CO_2$-impregnation should be free from $SO_2$-inclusions and should be taken for instance, from deep wells or from municipal water systems.

Exact pH values and $CO_2$ content may be attained through only a single impregnation. This can be achieved by employing a $CO_2$ surplus solution that has been stored a certain time, so that ionization equililbrium is achieved. The $CO_2$ surplus is calculated in such a way that after an almost complete ionization the $CO_2$ has dropped to the desired value of, for instance 0.5 and 1.7 g/l and the pH value adjusted between 4.5 and 7.

A very simple method, at a reasonable price, leading to precise results and thus creating in an optimal way and adapted to the concrete application case and specific plant the possiblity to adjust the spraying mixture with regard to its $CO_2$ content and its pH-value is provided by the fact that according to the invention the spraying mixture circulating system of usual agricultural spraying devices is used in order to exactly adjust the $CO_2$ content of the spraying mixture and its pH-value to the optimal values when driving to the field or during a spraying pause.

On the one hand this may be done by using a standard agricultural spraying device having a pump which alternately circulates the spraying mixture within the spraying mixture tank or supplies the spraying-pipes with spraying mixture in such a way that before spraying and during spraying pause the spraying mixture is constantly circulated, its pH value is measured and the $CO_2$ gas is being impregnated in measured dose in the spraying mixture until a fixed pH-value is obtained which is controlled to a constant value. For this purpose the impregnation system being described above in detail and known under the trademark Carborain can be installed at the delivery side of the pump of the spraying device and the spraying mixture can be led back by circulation to this impregnation system by means of a pump. It is also possible to install a venturi-tube section in the circulation of the spraying mixture. Many agricultural spraying devices are normally fitted with such venturi tube sections in the circulating-system of the spraying mixture. They serve alternatively to soak up water, dissolved minerals, liquid fertilizer or even a detergents liquid in this system. According to the invention this known arrangement is used with advantage because it is possible to soak up additionally $CO_2$ from a $CO_2$ source by means of the venturi tube section to mix it in the spraying mixture.

In both cases it is useful to install a pH-measuring probe at a suitable place of the circulating system of the spraying mixture and a controlling device which, depending on the pH-value measured, controls the connection between the $CO_2$-source and the impregnation-device and the venturi-tube section, respectively.

The invention intends also to provide an arrangement for exactly setting the $CO_2$ value and the pH-value being most favourable for the stimulation of the metabolism. For this purpose an impregnation arrangement is designed in the closed circulating system which is connected via a controllable valve-arrangement with a $CO_2$ source in order to impregnate the spraying mixture with $CO_2$ in an agricultural spraying device having a spraying mixture tank and a pump both forming a closed circulating system which is opened by means of the shift valve arrangement in order to put in series the tank and the pump with a distributor.

The closed circulating system may have a venturi-tube arrangement through which the circulated spraying mixture passes and to which a below atmospheric area is connected, on the one hand with the deposit of fertilizer and/or products of pest and disease control, and on the other hand via a controllable valve arrangement with the $CO_2$ source. For this purpose an already existing venturi-tube of an agricultural spraying device or an equivalent working arrangement may be added advantageously. Instead of this there is also the possiblity of installing within the closed circulating system of the agricultural spraying device, at the delivery side of the pump, a Carborain impregnation device which is a straight flow channel being filled with the spraying mixture having several little ring-steps and abrupt cross-sectional enlargments which are fitted immediately behind every ring-step with a circle of little borings which all lead into a $CO_2$ distributor chamber which is connected via the controllable valve arrangement with the $CO_2$ source surrounding the flow channel.

Advantageously, there may be added at least a pH-measuring device to the circulating system which is connected with a control for the $CO_2$ gas valve as well as for the control of the impregnation system depending on the measured pH-values.

Description of the Drawing

An arrangement for implementing the new procedure is described in detail in a schematic drawing illustrating a preferred embodiment The DRAWING shows the spraying mixture circulating system of an agricultural spraying device which is supplemented by features according to the invention.

Detailed Description

An agricultural spraying device is provided with a connection 1 for the different spraying tube sections. The connections are separately linked above the tube section with the spraying mixture distributor 3 which distributes by means of a trip switch 4 the spraying mixture supplied under pressure via conduit 5 just as required to one, several or to all the spraying tubes.

The spraying mixture is prepared in a spraying mixture tank 6 and kept stored. This tank takes in a fixed amount of water to which minerals for fertilization and/or spraying products for pest and disease control may be added. As it is possible that the fertilizer or products for pest and disease control may set at longer hold-up time, the spraying mixture is circulated. For this purpose the out-let 8 of the spraying mixture tank 6 is connected via the extraction-fitting 9 and a conduit 10 with the suction side of a spraying pump of which the delivery side 12 is connected via a conduit 13 with a shift valve arrangement 14. This arrangement is able when required to connect the conduit 13 with the supply conduit 5 for the distributor 3 so that it is possible to lead the spraying mixture taken from the spraying mixture tank 6 to the different spraying tube sections for the application of the spraying mixture. On the way to the field or during spraying pause, on the other hand, the shift valve arrangement 14 is switched in such a way that the conduit 13 is connected with the conduit 15 via which the spraying mixture is led back via the conduit 16 into the spraying mixture tank 6. Very oftern there is also installed an additional agitator arrangement on the like in order to keep the mixture in the tank rotating and to avoid deposits and sedimentation of the mixture. For this purpose the tube 16 may, for example, be connected to a valve tube being installed in the tank which injects the mixture in the mixture deposit of the tank in thin jets.

In simpler spraying mixture devices the mixture is separately manually mixed with the admixtures and is then put in the tank 6. With high performance agricultural spraying devices, however, it is possible that fertilizer and/or products for pest and disease control may be automatically measured into the tank 6 which is filled with water. For this purpose the leading-back-tube arrangement 15 is provided with a suction arrangement 35 with a venturi tube section 36 having a suction area with which the suction lines 39, 40 are connected via the accompanying controllable valves 37, 38.

The suction pipes 39, 40 are conncected to a reservoir of liquid and liquefied minerals and the suction part 40 with a reservoir liquid products for fertilization, pest and disease control. Via a control arrangement it is possible to switch the pump 11, the suction fitting 9, the shift valve arrangement 14 and the valves 37, 38 of the measuring arrangement.

The agricultural spraying device as described so far is customary in the trade.

This device is according to the invention further developed by the fact that in the circulating system of the spraying mixture there is an arrangement installed impregnating the spraying mixture with $CO_2$. For this purpose the impregnation-device 20 being already described in detail may be connected with the hydraulic main 12 of the pump 11. As explained above this impregnation device has a straight flow channel 21 being completely filled by the spraying mixture flowing through it. The channel has small steps in the cross section and gas passage borings within the stages which lead into a channel surrounding the distributor chamber for $CO_2$. The distributor chamber is connected with a $CO_2$ pressure gas source 24. Additionally, the device may also have pressure indicators for the static water pressure in the channel and for the static gas pressure within the gas-distributor chamber. In this way the spraying mixture being constantly circulated within the circulating system by pump 11 is always flowing through the impregnation device 20, or rather as long as the mixture is being led back in the tank 6 by means of the shift valve arrangement 14. This pumping procedure is also working during the measuring of soluble minerals and products for pest and disease control. In this way there is a constant contact of the spraying mixture with $CO_2$, so that it is possible that a fixed $CO_2$ content and a fixed pH-value is set exactly and kept constant. For this purpose the device is at least provided with a pH-measuring probe. This probe can, for instance, be installed in the suction field 10 near 29 and be connected via a measuring conduit 30 with a control device 25.

It is possible, however, that such a pH-measuring probe is provided at a different place. It is also useful to install additionally a control-measuring probe 27 in the supply line 5 which is as well connected with a control device via a control conduit 28. The control device controls the valve 23 via a control conduit 26 between $CO_2$ source 24 and impregnation device 20. Changes concerning the $CO_2$ concentration and the pH-value in the spraying mixture which may appear when mixing via the device 35 due to ionization and dilution effects can be reliably, precisely and speedily compensated. Depending on the culture being treated and depending on further conditions the desired values can be exactly set. In this way an optimal setting of the $CO_2$ content and pH-value as well as a very economic and exact measuring of the amounts of minerals and the amounts of products for pest and disease control being applied is possible, so that these products are made available for the plants in an optimal way.

A further advantage consists in the fact that the dissolution procedures for the added minerals and products for pest and disease control are essentially accelerated and optimized by means of the constant control and setting of the $CO_2$ content and the pH value. On top of that in most cases it is possible to do without an agitator or the like in tank 6, as under the influence of carbonic acid there is no fear of sedimentation in the tank. Also sedimentation is avoided within the application system, in particular within the spraying nozzles, tubes and valves. In this way the usual, time intensive cleaning procedures which have been necessary up to now are widely avoided or severely limited.

Instead of arranging the impregnation device 20 within the hydraulic line 12 of the pump 11 it is also possible to use advantageously the measuring device 35 for the purposes of the invention in an optimal and inexpensive way, in case the circulating system of the agricultural spraying device is already provided with one. For this purpose an additional suction channel with valve 41 which is connected with the $CO_2$ source 24 may be installed at the suction part of the venturi tube 36.

In this case the valve arrangement 41 is connected to the control device 25. The impregnation of the spraying mixture with $CO_2$ by the venturi tube 36 is in fact obviously less effective than by the impregnation device 20 and needs therefore a longer circulation phase. The desired $CO_2$ and pH values may also be exactly set by the constant circulating of the spraying mixture and the constantly repeated contact of the spraying mixture with $CO_2$ within the venturi tube section 36 as well as by longer circulation times. Using the agricultural spraying device in such a way is more reasonable in costs.

In this way by means of modern pH measuring electronics and appropriated switch automatic in the control device 25, an optimally and specifically on the culture plant adjusted impregnation and pH value lowering may be achieved.

Instead via the valve 25 the control can also be effected by switching off and on of the pump itself. here it may be useful that the control device 25 controls the switch condition of the shift valve arrangement 14 via the conduit 32 in order to trigger off the impregnation only during the circulation and not during the application of the spraying mixture.

I claim:

1. A method of preparing and applying an aqueous solution containing carbonic acid and its dissociation products, in amounts suficient to increase metabolism processes and decomposition procedures of minerals including nitrates stored within culture plants, comprising the steps of:

providing a closed fluid circuit having a fluid reservoir, conduit means and a pumping means for circulating fluid contained within said circuit;

providing at least one impregnating zone within said circuit having impregnating means for introducing carbon dioxide into the fluid within said circuit, the impregnating means being connected to a valved carbon dioxide source;

providing fluid distributing and applying means for delivering the carbon dioxide impegnated fluid to said culture plants;

providing a shiftable valve means in said ciruit to allow delivery of fluid from said circuit into a supply conduit connectable to said distributing and applying means;

providing means for sensing the pH-value of the fluid within said circuit;

providing a control means and means for communicating said control with said pH-valve sensing means, said valved carbon dioxide source and said shiftable valve means; and operating the components of the system by allowing the valved carbon dioxide source to cause carbon dioxide to be introduced into said fluid and the pumping means to simultaneously recirculate the fluid through said impregnating zone for a time sufficient to almost completely ionize salts and other ionizable chemical substances which may be contained in said fluid, and impregnating said recirculating fluid with carbon dioxide up to a preselected carbon dioxide content of between 0.05 and 2.5 g/l of said fluid and until a preselected pH-value between 4.5 and 7 is sensed; then closing said valved carbon dioxide source and opening said shiftable valve means for allowing the fluid to pass into the supply conduit.

2. A system for preparing and applying an aqueous solution containing carbonic acid and its dissociation products in amounts sufficient to increase metabolism processes and decomposition pathways of minerals including nitrates stored within cluture plants, comprising:

conduit means in a circuit for circulating said aqueous solution;

a fluid reservoir communicating with said conduit means;

pumping means to circulate said aqueous solution from said reservoir through said conduit means, said pumping means and said fluid reservoir being in a closed circuit;

a carbon dioxide source communicating with said circuit;

a valve arrangement between said carbon dioxide source and said circuit for regulating entry of carbon dioxide into said aqueous solution;

an impregnating zone within said circuit having an impregnating means for introducing carbon dioxide, supplied by said carbon dioxide source, into the aqueous solution within said circuit;

fluid distributing and applying means for delivering carbon dioxide impregnated aqueous solution to said culture plants, said fluid distributing means communicating with said circuit;

pH-value sensing means linked to said circuit to measure pH of said circulating aqueous solution; and a control means responding to a pH-value signal measured by said pH-sensing means for operating said valve arrangement.

3. A system according to claim 2 wherein said impregnating means includes a straignt flow channel having small steps of abrupt cross-sectional enlargements, at least some of said steps each having a series of small holes leading into a distributor chamber.

* * * * *